(12) United States Patent
Levine et al.

(10) Patent No.: US 9,389,090 B1
(45) Date of Patent: Jul. 12, 2016

(54) SYSTEM FOR BIDIRECTIONAL NAVIGATION VIEWING AND METHODS THEREOF

(71) Applicant: WAZE Mobile Ltd., Ra'anana (IL)

(72) Inventors: Uri Levine, Kfar Saba (IL); Ehud Shabtai, Tel-Aviv (IL); Amir Shinar, Moshav Herut (IL); Yuval Shmuelevitz, Ramat Hasharon (IL)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/971,608

(22) Filed: Aug. 20, 2013

Related U.S. Application Data

(60) Provisional application No. 61/691,393, filed on Aug. 21, 2012.

(51) Int. Cl.
*G01C 21/00* (2006.01)
*G01C 21/34* (2006.01)

(52) U.S. Cl.
CPC .................................. *G01C 21/3438* (2013.01)

(58) Field of Classification Search
CPC .................. G08G 1/096827; G08G 1/096811
See application file for complete search history.

(56) References Cited

U.S. PATENT DOCUMENTS

| 8,271,057 | B2 | 9/2012 | Levine et al. |
| 8,612,136 | B2 | 12/2013 | Levine et al. |
| 2006/0224969 | A1* | 10/2006 | Marston ............... G06Q 10/109 715/753 |
| 2009/0287401 | A1 | 11/2009 | Levine et al. |
| 2011/0306366 | A1* | 12/2011 | Trussel et al. .................. 455/457 |
| 2012/0041675 | A1* | 2/2012 | Juliver et al. .................. 701/465 |

OTHER PUBLICATIONS

"Share Maps (classic maps)", [online], [retrieved Mar. 9, 2014], <http://support.google.com/maps/answer>, 2 pages.
"Waze iPhone App Provides Real-Time, Crowdsourced Traffic Data", [online], Aug. 6, 2009, <http://www.cnet.com/news/waze-iphone-app-provides-real-time-crowdsourced-traffic-data/>, 4 pages.

* cited by examiner

*Primary Examiner* — John R Olszewski
*Assistant Examiner* — Jason Roberson
(74) *Attorney, Agent, or Firm* — Lerner, David, Littenberg, Krumholz & Mentlik, LLP

(57) ABSTRACT

Embodiments of the present invention are directed toward a system for bidirectional navigation viewing and methods thereof. The system includes at least one server and a first client device and a second client device that are both communicatively coupled with the server. The server is configured to continuously provide data to both devices for bidirectional viewing of an optimal route from a source location to a destination location on the first client device and on the second client device. The source location and the destination location are typically specified by the first client device and the second client device, respectively. The source location is typically the current location of the first device. The optimal route is continuously updated based on information sent to the server. The information typically includes updated location information of the first device and real-time traffic information between the two locations.

16 Claims, 10 Drawing Sheets

SYSTEM FOR BIDIRECTIONAL NAVIGATION VIEWING AND METHODS THEREOF

RELATED APPLICATIONS

This application claims benefit of priority under 35 U.S.C. section 119(e) of the U.S. Provisional patent application Ser. No. 61/691,393 filed Aug. 21, 2012, entitled "Bidirectional Navigation Viewing," which is hereby incorporated by reference in its entirety.

FIELD OF THE INVENTION

The present invention relates to navigation systems, and more particularly to a system for bidirectional navigation viewing and methods thereof.

BACKGROUND OF THE INVENTION

Only a small part of regular driving involves navigating to unknown destinations. By contrast, the majority of everyday driving entails countless social commitments. An omnibus survey of 1000 American drivers, commissioned by Waze, found that over 50% of drivers regularly pick up friends and family. In particular,
- 52% of drivers polled indicated giving rides to other people at least 1 to 5 times per month, and 20% do so daily;
- 28% of drivers polled indicated regular pick-ups of children; and
- 23% of drivers regularly pick up a spouse.

These social commitments can be frustrating for a eagerly waiting party to be picked up by or to meet up with a driving party by, for example, not knowing the whereabouts of the driving party or not knowing how much longer the wait will be until the driving party arrives. If the waiting party is unclear or unsure of his or her own location, these social commitments can also be frustrating for the driving party who is trying to reach the waiting party.

What is needed is a system that lets both parties be better informed about the locations of the parties and estimated arrival times.

SUMMARY OF THE INVENTION

Embodiments of the present invention are directed toward a system for bidirectional navigation viewing and methods thereof. The system includes at least one server and a first client device and a second client device that are both communicatively coupled with the server. The server is configured to continuously provide data to both devices for bidirectional viewing of an optimal route from a source location to a destination location on the first client device and on the second client device. The source location and the destination location are typically specified by the first client device and the second client device, respectively. The source location is typically the current location of the first device. The optimal route is continuously updated based on information sent to the server. The information typically includes updated location information of the first device and real-time traffic information between the two locations.

In one aspect, a non-transitory computer-readable medium is configured to store instructions that, when executed by a computing device, cause the computing device to perform a method. The method includes communicatively coupling a first device with a second device, calculating an optimal route from a starting location of a first device towards a first target location specified by the second device, and providing data for bidirectional viewing of the optimal route on the first device and the second device.

In some embodiments, the computing device communicatively couples the first device with the second device by establishing a unique URL address to a web page accessible by the second device, wherein the web page is configured to display the data when a request is valid, obtaining the first target location from the second device, and obtaining the starting location from the first device. In some embodiments, the request is invalid when the first device is no longer communicatively coupled with the computing device or when the request is cancelled.

In some embodiments, the computing device provides data for bidirectional viewing includes by presenting a live map displaying a user of the first device en route towards the first target location, and the user's estimated time of arrival (ETA) to the first target location.

In some embodiments, the starting location is automatically determined by the first device. In some embodiments, the starting location is the current location of the first device.

In some embodiments, the first target location is automatically determined by the second device. Alternatively, the first target location is manually entered by a user of the second device.

In some embodiments, the method further includes continually receiving updated location information of the first device, thereby updating the optimal route based on at least the location information of the first device. The optimal route can also be updated based on at least one of real-time traffic information and a newly added second target location. In some embodiments, the real-time traffic information is determined based at least on real-time community information provided to the computing device from other devices communicatively coupled with the computing device.

In some embodiments, the method further includes sharing the optimal route with other users such that the other users are able to view the optimal route.

In another aspect, a system includes a plurality of client devices and at least one server. The plurality of client devices includes a first client device and a second client device. The first client device typically includes a navigation application and is configured to initiate a meet up request. The second client device typically includes a web browser.

The server is typically configured to continuously provide data for bidirectional viewing of an optimal route from a source location to a destination location in the navigation application of the first device and in the web browser of the second device. In some embodiments, the optimal route is determined by the one server.

In some embodiments, the navigation application is configured to launch a program available on the first client device to inform the second client device of the meet up request. In some embodiments, the meet up request includes an unique URL to a web page configured to display the optimal route.

In some embodiments, the meet up request is approved when the unique link is activated on the second client device and when the destination location is provided by the second client device to the at least one server.

In some embodiments, the destination location is the current location of the second client device. In some embodiments, the destination location is automatically modified based on the current location of the second client device. In some embodiments, the destination location is modifiable by the second client device.

BRIEF DESCRIPTION OF THE DRAWINGS

Reference will now be made in detail to implementations of the present invention as illustrated in the accompanying drawings. The same reference indicators will be used throughout the drawings and the following detailed description to refer to the same or like parts.

DETAILED DESCRIPTION OF THE INVENTION

In the following description, numerous details are set forth for purposes of explanation. However, one of ordinary skill in the art will realize that the invention may be practiced without the use of these specific details. Thus, the present invention is not intended to be limited to the embodiments shown but is to be accorded the widest scope consistent with the principles and features described herein.

Embodiments of the present invention are directed toward a system for bidirectional navigation viewing and methods thereof. The system includes at least one server and a first client device and a second client device that are both communicatively coupled with the server. The server is configured to continuously provide data to both devices for bidirectional viewing of an optimal route from a source location to a destination location on the first client device and on the second client device. The source location and the destination location are typically specified by the first client device and the second client device, respectively. The source location is typically the current location of the first device. The optimal route is continuously updated based on information sent to the server. The information typically includes updated location information of the first device and real-time traffic information between the two locations.

It will be become apparent from the description that the destination location can be that of a stationary target (e.g., landmark or facility) or a moving target (e.g., location of the second device, which may or may not be moving around while the first device is traveling towards the second device). If the destination is of a moving target, then the optimal route is also based upon location changes of the second device.

Figure 1:
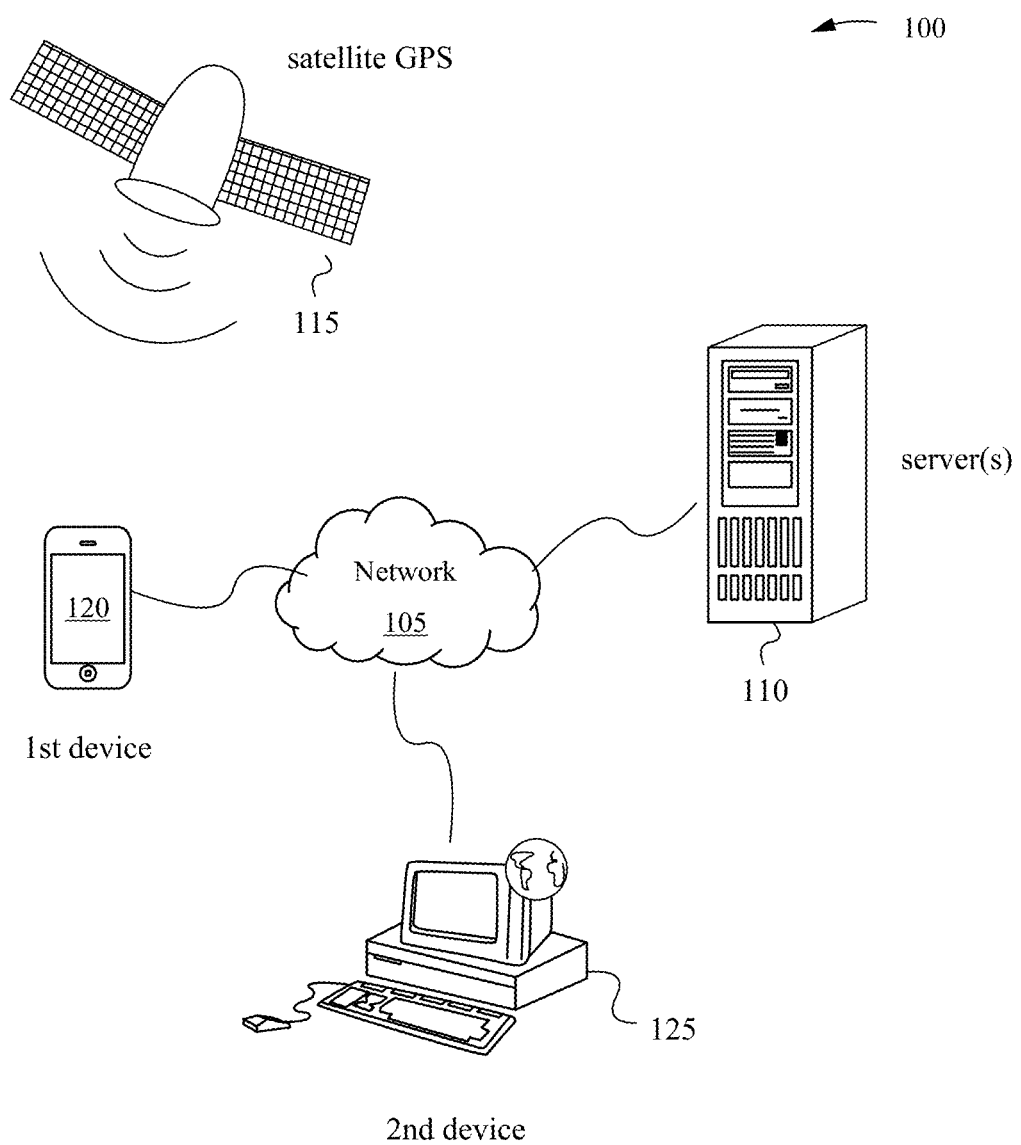
FIG. 1 illustrates an exemplary system in accordance with the present invention.

FIG. 1 illustrates an exemplary system 100 in accordance with the present invention. The system 100 includes a network 105 and entities communicative coupled with the network 105. Networked entities include at least one server 110 and a plurality of client devices, including a first client device 120 and a second client device 125. The server 110 and each of the plurality of client devices are communicatively coupled with each other via the network 105. Each of the plurality of client devices is associated with a user. Assume, for purposes of discussion, the user of the first client device 120 is a principal user and the user of the second client device 125 is a dependent user waiting to be picked up by or to meet up with the principal user. The present invention advantageously displays on the first client device 120 and the second client device 125 a dynamically updated optimal route from the current location of the first client device 120 towards a target location specified by the user of the second client device 125, along with dynamically updated en-route location of the first client device 120 and an estimate time of arrival (ETA). It should become apparent from the disclosure of the present invention that the user of the second client device 125 can simply be a location provider of the target location and not necessarily be the person waiting to be picking up or meet up.

The first client device 120 typically includes a G.P.S. module for receiving radio communication from at least one G.P.S. satellite 115. The first client device 120, as shown in FIG. 1, is a mobile phone, although the first client device 120 can be any mobile device. The first client device 120 typically includes a mobile navigation application installed thereon. In some embodiments, the mobile navigation application is community-based. An exemplary community-based navigation application is discussed in U.S. patent application Ser. No. 12/122,810, filed May 19, 2008 and entitled "System and Method for Realtime Community Information Exchange," which is incorporated by reference in its entirety. The mobile navigation application is configured to communicate with the server 110 to send the current G.P.S. location of the first client device 120 and to receive map data for making smart travel choices to arrive at a destination as soon as possible. In some embodiments, the mobile navigation application includes a meet up feature configured to provide the user of the first client device 120 a target location and an optimal route towards the target location without having the user of the first client device 120 specify the target location.

The present invention does not require that the second client device 120 have installed thereon a mobile navigation application, such as the mobile navigation application discussed in U.S. patent application Ser. No. 12/122,810, filed May 19, 2008 and entitled "System and Method for Realtime Community Information Exchange." However, the second client device 120 is typically web enabled for receiving data over the Internet, including request messages sent from other client devices, such as the first client device 120, and map data from the server 110. As discussed further below, a request message can be sent via from the first client device 120 to the second client device 125 email, IM, SMS, a social media application, or the like as long as the user of the second client device 125 is able to access the request message. As such, in some embodiments, the second client device 125 includes an SMS client and/or an IM client to receive request messages sent via SMS or IM. The second client device 125, as shown in FIG. 1, is a desktop computer, although the second client device 125 can be any web-enabled computing device, such as a mobile phone, a tablet, or a laptop computer. Also, as discussed elsewhere, the second client device 125 can be a stationary device or a roaming device.

The server 110 includes a server-side navigation application configured to communicate with mobile navigation applications to send map data to and receive G.P.S. data from the mobile navigation applications. The server 110 is configured to calculate traffic parameters, such as current traffic speed at a given road based on the momentary locations of users. The server 110 is also configured to calculate and advise users of preferred roads to take in order to arrive at the requested location with minimum delay. An exemplary server is discussed in U.S. patent application Ser. No. 12/199,187, filed Aug. 27, 2008 and entitled "System and Method for Road Map Creation," which is incorporated by reference in its entirety.

Figure 2:
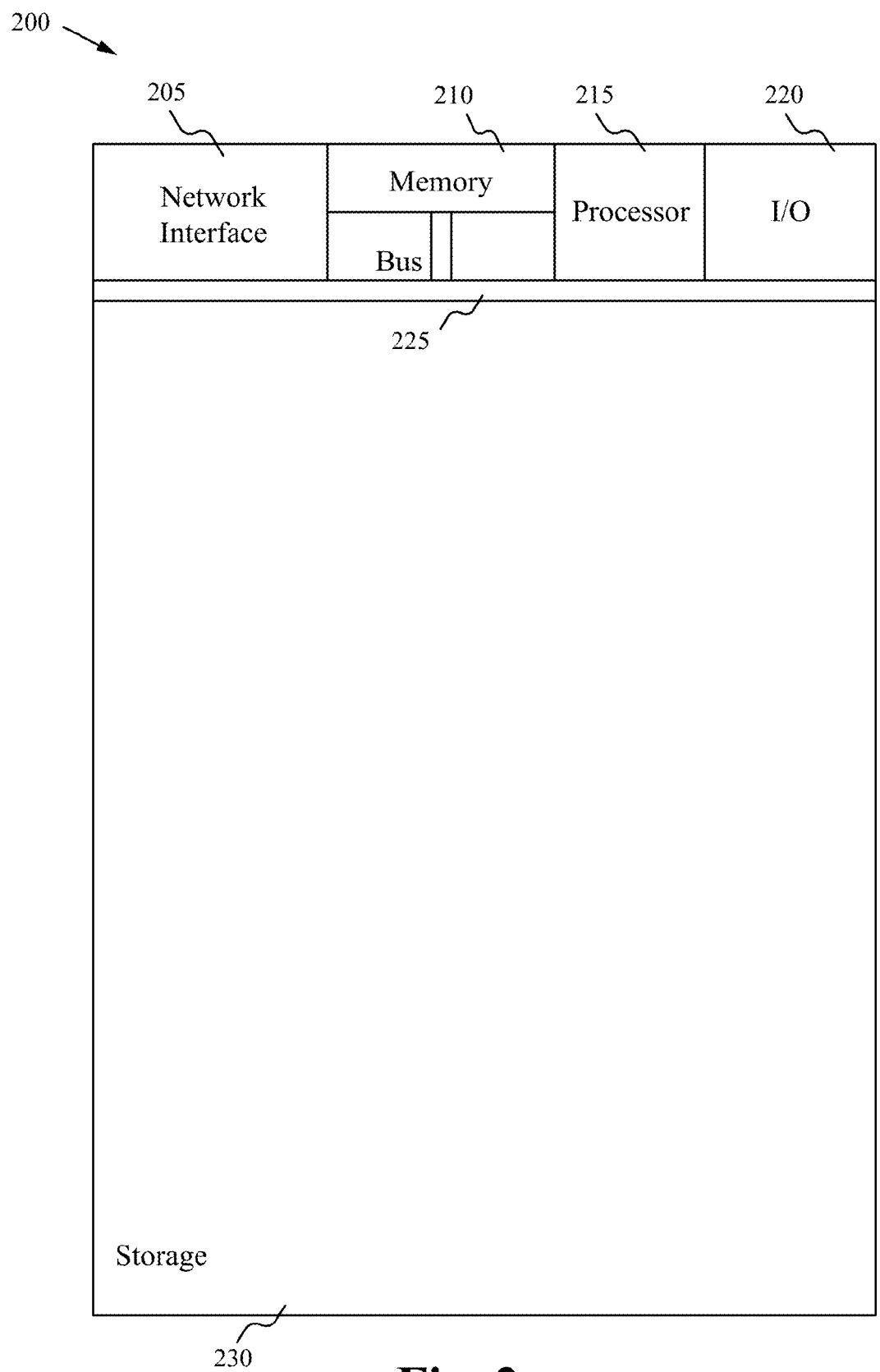
FIG. 2 illustrates a graphical representation of an exemplary computing device in accordance with the present invention.

FIG. 2 illustrates a graphical representation of an exemplary computing device 200 in accordance with the present invention. The computing device 200 is capable of being communicatively coupled to the network 105 to transmit and receive data to and from other entities communicatively coupled to the network 105. In general, a hardware structure suitable for implementing the server 250 includes a network interface 205, a memory 200, processor 215, I/O device(s) 200, a bus 225 and a storage device 230. The choice of processor is not critical as long as the processor 215 has sufficient speed. The memory 210 is any conventional computer memory known in the art. The storage device 230 is a hard drive, CDROM, CDRW, DVD, DVDRW, flash memory card or any other storage device. The computing device 200 is able to include one or more network interfaces 205. An example of a network interface includes a network card connected to an Ethernet or other type of LAN. The I/O device(s) 220 are able to include one or more of the following: keyboard, mouse, monitor, display, printer, modem and other devices. Applications, such as a browser application and/or a server-side navigation application in accordance with an embodiment of the present invention, are likely to be stored in the storage device 230 and memory 210 and are executed by the processor 215. The server 110 and the second client device 125 illustrated in FIG. 1 are similarly configured as the computing device 200.

Figure 3:
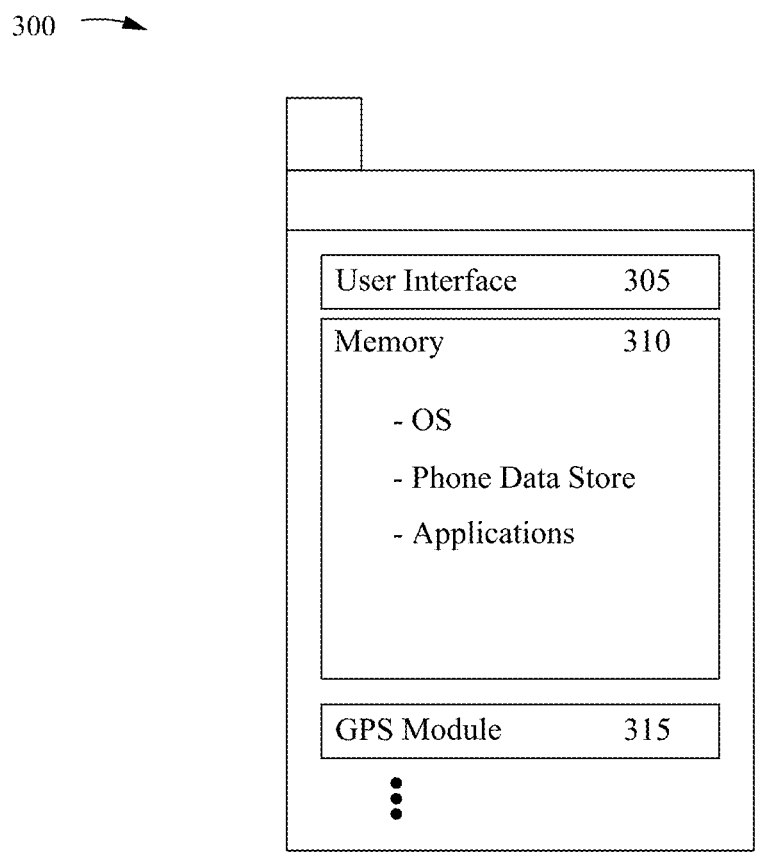
FIG. 3 illustrates a graphical representation of an exemplary mobile device in accordance with the present invention.

FIG. 3 illustrates a graphical representation of an exemplary mobile device 300 in accordance with the present invention. The mobile device 300 is capable of being communicatively coupled to the network 105 to transmit voice and data communications to other devices communicatively coupled to the network 105. In general, a hardware structure suitable for implementing the mobile device 300 includes system memory 310 which may further include an operating system (OS) having operating system services including telephony and linking services, networking services, multimedia and graphics display services all provided to a user interface (UI) 305. The OS may be the mobile device's proprietary OS, BREW, Android, iOS or any other device or operating system suitable for a phone. The OS can also provide an SMS client built into the OS allowing short messages to be provided across the network 105 to and from other users. Similarly, the OS can also provide an IM client built into the OS allowing instant messages to be provided across the network 105 to and from other users. The mobile device 300 includes a native phone data store which contains an address book of contacts and other information which may be provided by a user. Applications, including the mobile navigation application, are also loaded into the mobile device 300. As will be well understood by one of average skill in the art, the mobile navigation application can be provided by a phone manufacturer or downloaded by the user at a later time. To download and install the mobile navigation application, the user selects the mobile navigation application from offerings provided by a source, such as a service provider, a carrier, an app store or an enterprise service, and installs the mobile navigation application onto the mobile device 300. A G.P.S. module 315 receives G.P.S. signals to determine the mobile device's 300 location. The G.P.S. module 315 typically provides location information (e.g., longitude and latitude coordinates). The first client device 120 illustrated in FIG. 1 is similarly configured as the mobile device 300.

Figure 4:
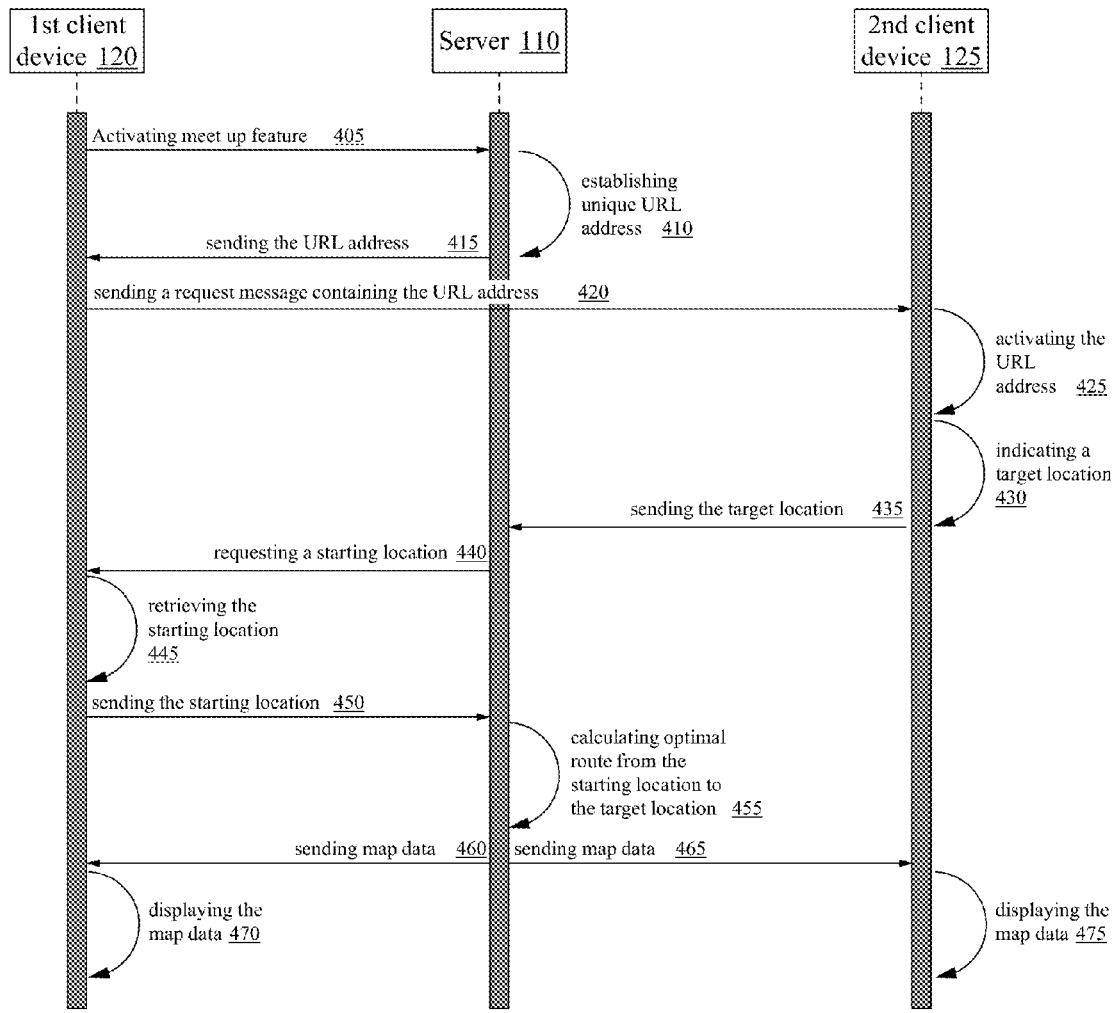
FIG. 4 illustrates exemplary flow diagram in accordance with the present invention.

FIG. 4 illustrates exemplary flow diagram 400 in accordance with the present invention. The first client device 120 is typically G.P.S.-enabled and has installed thereon a mobile navigation application that is integrated with or interacts with a meet up feature of the present invention. Assume that the meet up feature is included with the mobile navigation application. The second client device 125 is typically web-enabled. The flow diagram 400 will be discussed with reference to exemplary screen shots illustrated in FIGS. 5A-5J.

Figure 5B:
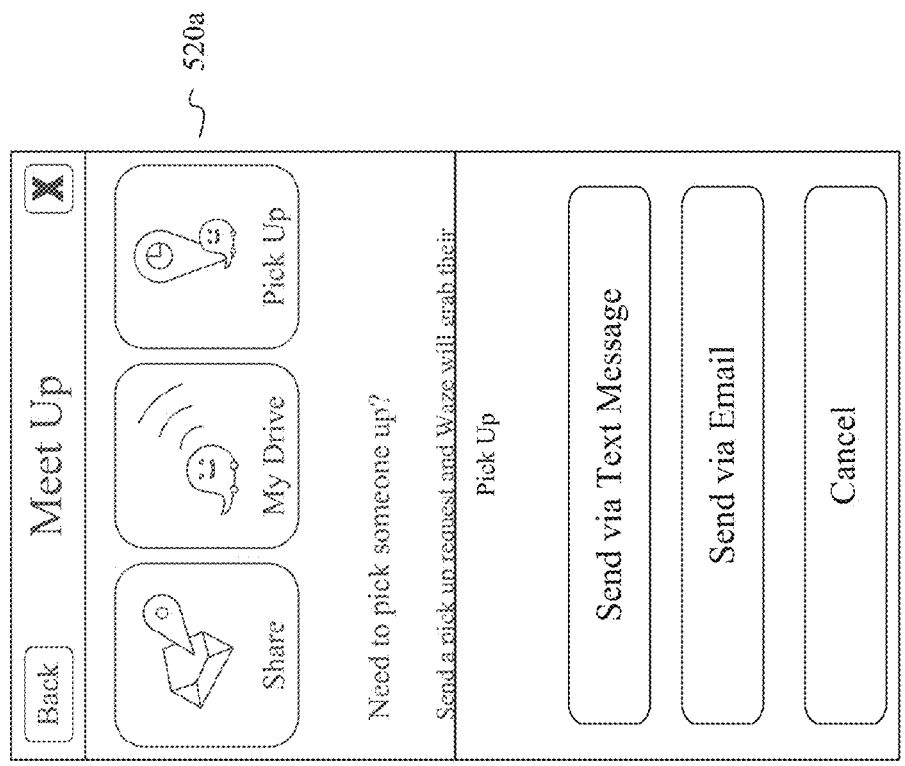
FIGS. 5A-5J illustrate screen shot of either the first client device or the second client device in accordance with the present invention.
Figure 5A:
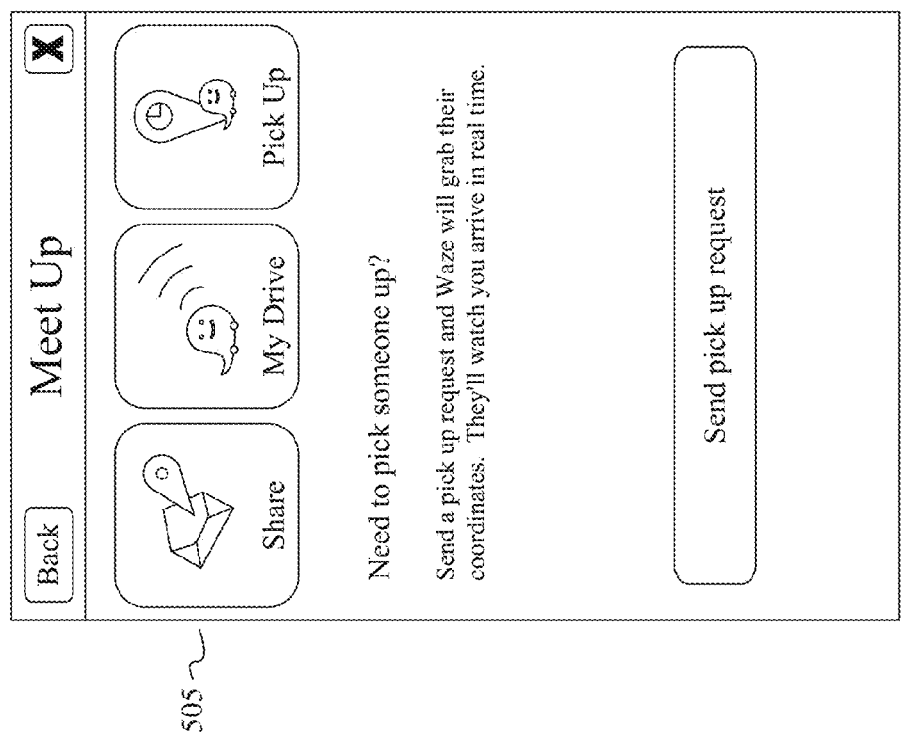

The flow diagram 400 begins at a step 405. At the step 405, the meet up feature of the mobile navigation application executing on the first client device 120 is activated. This activation informs the server 110 that the principal user desires to send a meet up request. FIG. 5A illustrates an exemplary screen shot 505 of the first client device 120 of the meet up feature.

At a step 410, a unique URL address to a web page is established by the server 110. The URL address will be included in the meet up request to be sent to a recipient of the meet up request (e.g., the user of the second client device 125). The web page associated with the URL address can be viewed using a web browser on the second client device 125 and is dynamically and periodically updated by the server 110.

At a step 415, the unique URL address is sent from the server 110 to the first client device 120.

Figure 5C:
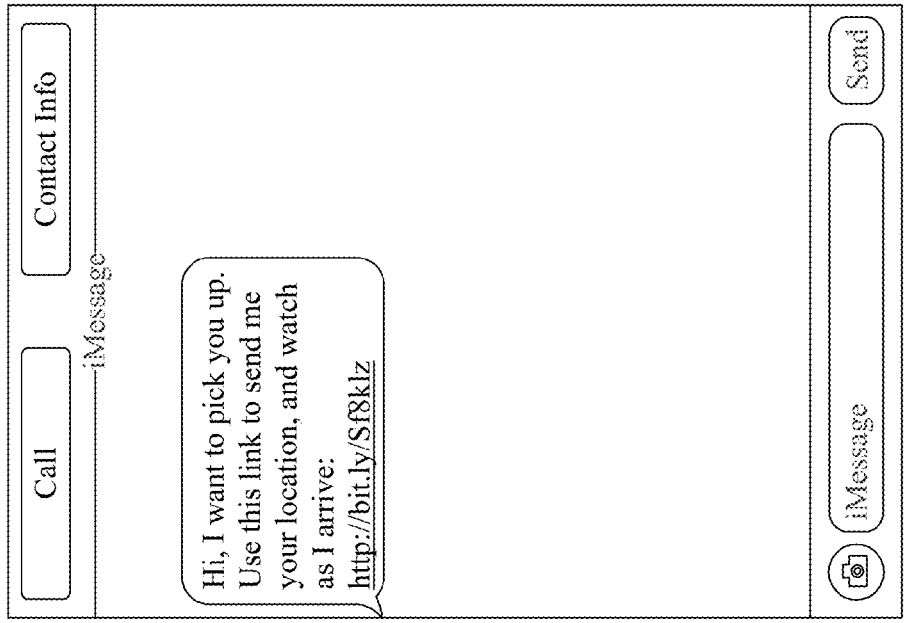

At a step 420, a request message containing the URL address is created on the first client device 120 and is sent to the second client device 125. In some embodiments, the principal user is first presented with different available methods of creating and sending the request message. For example, the request message can be created and sent via email, SMS or IM. Alternatively, the request message can be created and sent through a social media application, such as Facebook®, Google+® or the like. FIG. 5B illustrates an exemplary screen shot 520a of the first client device 120 of a list of different available methods of creating and sending the request message, including email and SMS. Upon selecting a particular method of creating and sending the request message, the respective program is automatically launched therefrom. Typically, a short description and the URL address are automatically included as part of the request message. However, the principal user is able to edit the message in the request message prior to sending the request message. FIG. 5C illustrates an exemplary screen shot 520b of the first client device 120 of a sent SMS message. The SMS message includes default content, such as "Hi, I want to pick you up. Use this link to send me your location and watch as I arrive:", and a unique URL address established by the server 110 at the Step 410.

Figure 5D:
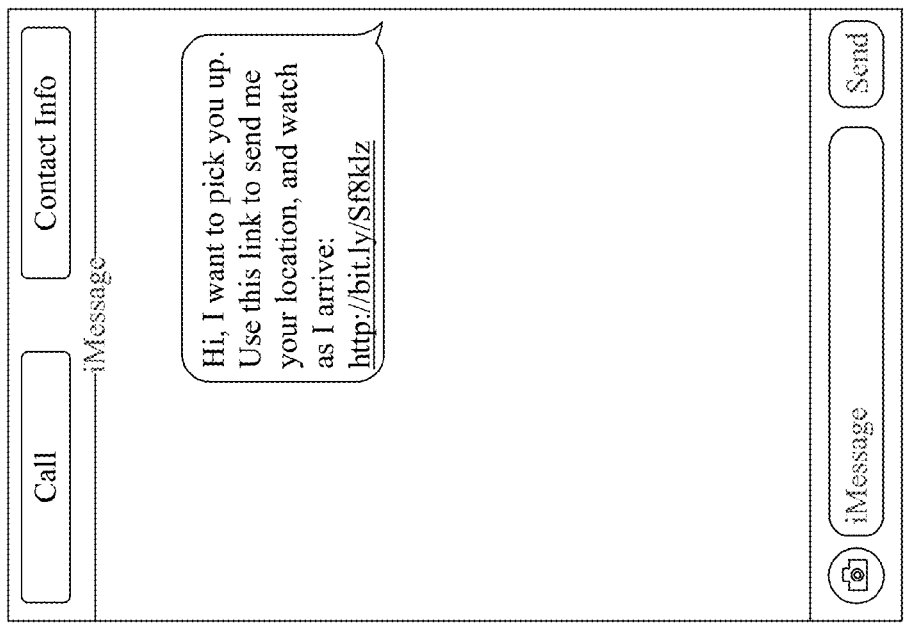

When the request message is received at the second client device 125, the recipient (e.g., dependent user) opens the request message using the appropriate destination client application. For example, if the request message was created and sent using an email client on the first client device 120, then the request message is opened using an email client on the second client device 125. For another example, if the request message was created and sent using an SMS client on the first client device 120, then the request message is opened using an SMS client on the second client device 125. FIG. 5D illustrates an exemplary screen shot 525 of the second client device 125 of a received SMS message.

Assuming the dependent user wishes to be picked up or to meet up with the principal user, at a step 425, the URL address is activated from within the request message, which automatically launches a web page in a web browser accessing data from the web address. Typically, the web page is configured to display map data. The map data typically includes a map, displaying streaming data of the current location of the principal user and an optimal route for the principal user to arrive at a target location, and the principal user's ETA to the target location.

Figure 5F:
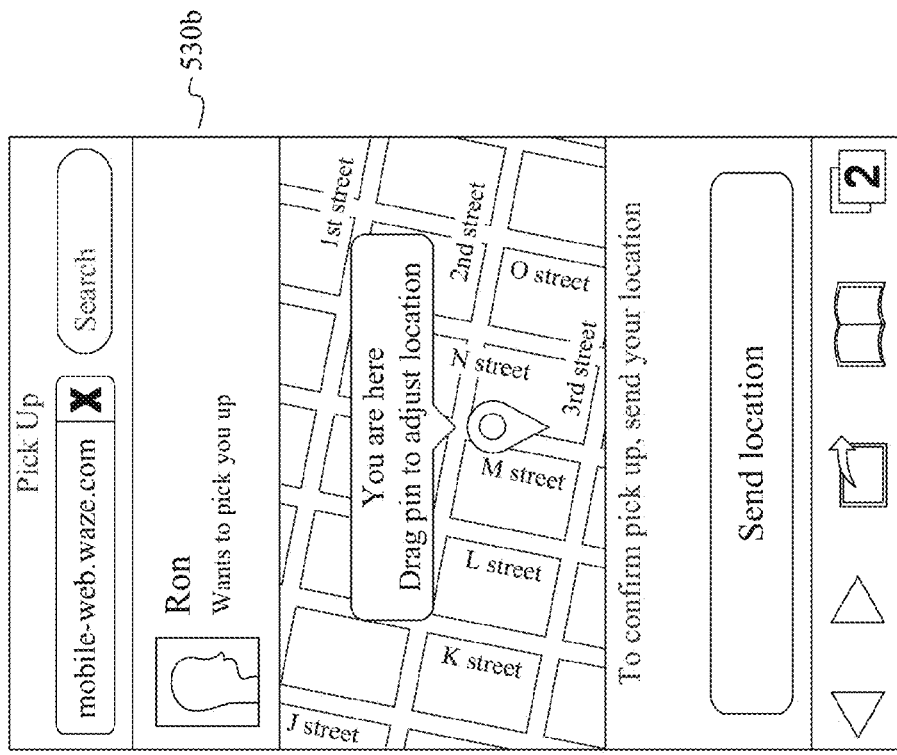
Figure 5E:
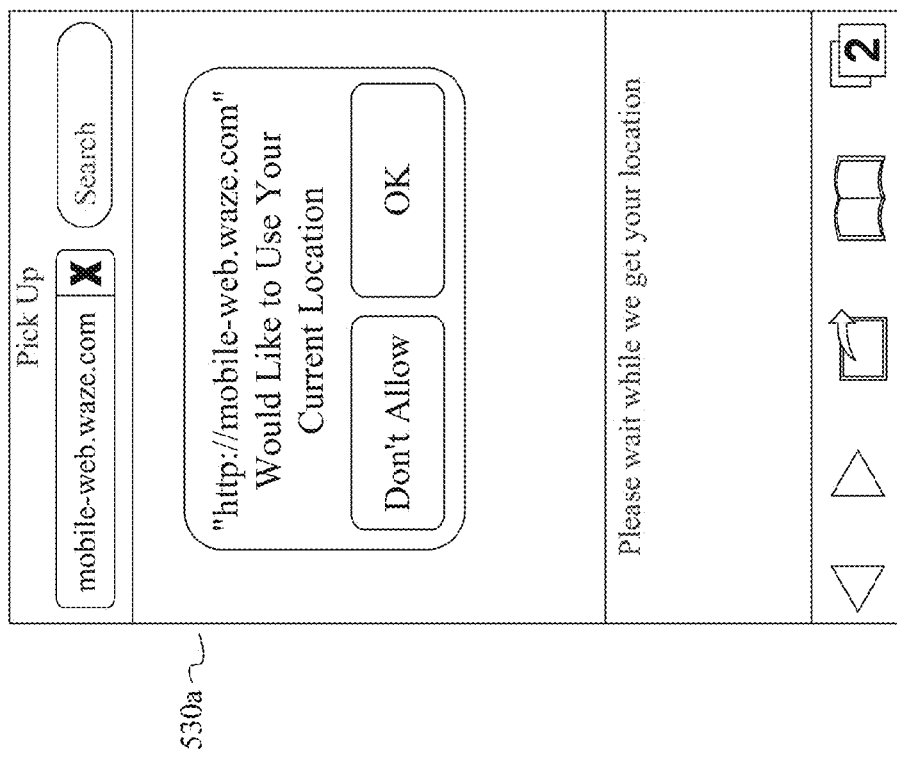

At a step 430, a target location is indicated on the second client device 125. In some embodiments, the dependent user is prompted whether he/she would like use the current location automatically determined. FIG. 5E illustrates a screen shot 530a of the second client device 125 of the prompt. If the dependent user would like to use the second client device's current location, then the target location is automatically set to the location of the second client device. In some embodiments, the target location is determined by a G.P.S. module coupled with the second client device 125 or is determined by another program running on the second client device 125. A display pin is shown on the map, indicating the target location.

The target location can be fine tuned such as by dragging the display pin on the map to adjust the location. FIG. 5F illustrates an exemplary screen shot 530b of the second client device 125 of the map and the movable pin. Alternatively, the dependent user is able to manually enter an address or select a previous destination (e.g., from the history list or favorite places list) as the target location.

After the target location has been specified, at a step 435, the target location is sent to and received at the server 110. The meet up request is approved when the URL link is activated on the second client device 125 and when the target location is provided by the second client device 125 to the server 110.

In some embodiments, the target location can be manually or automatically modified anytime thereafter. For example, the dependent user is not required to remain stationary. In fact, the dependent user is able to move about (e.g., move down a street or to the next block) while waiting for the principal user to arrive. Information regarding the dependent user's current location is relayed in real time to the server 110 so that the server 110 is able to take into consideration of the dependent user when calculating an optimal route.

Figure 5H:
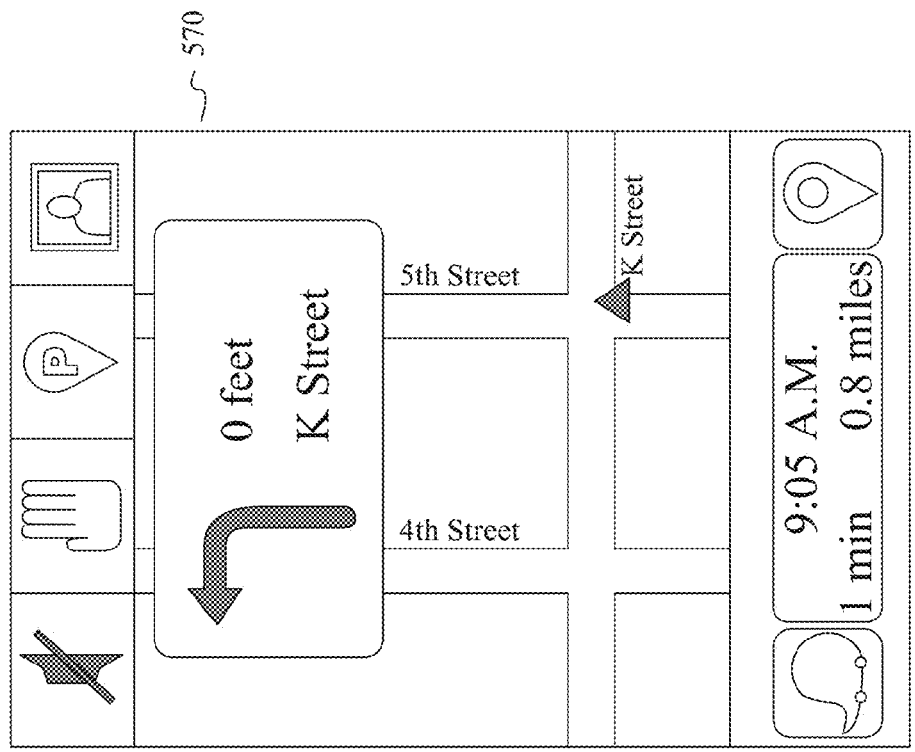
Figure 5G:
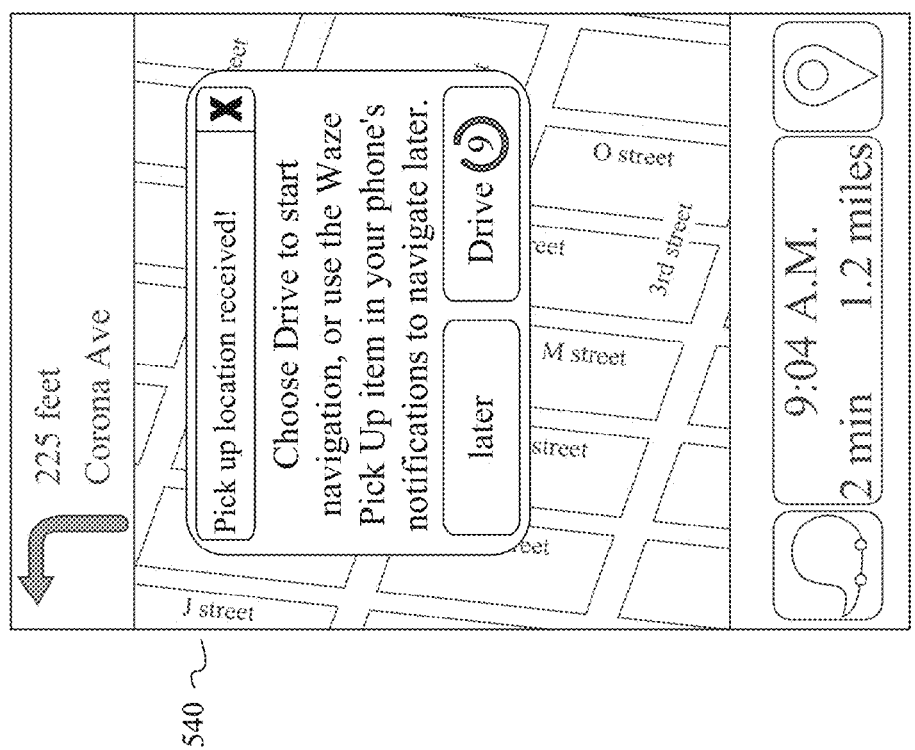

Upon receiving the target location from the second client device 125, at a step 440, a request for a starting location of the first client device 120 is sent from the server 110 to the first client device 120. In some embodiments, the request for a starting location is in a form of a notification to the first client device 120 stating that the dependent user has approved of the request and whether the principal user would like to start navigation. FIG. 5G illustrates an exemplary screen shot 540 of the first client device 120 of the notification. If the principal user does not affirmatively indicate yes (e.g., activating "Drive" icon or the like) and does not affirmatively indicate no (e.g., activating "Later" icon or the like), then navigation operation automatically begins after a predetermined amount of time has passed (e.g., 10 seconds). This automatic begin is advantageously useful in a situation where the principal user is unable to and/or cannot affirmatively active the "Drive" icon because the principal user is, for example, currently driving. The navigation operation includes the following steps 445-470. However, navigation can resume/start at a later time by accessing, such as, the first client device's notifications.

At a step 445, the starting location is automatically retrieved by the first client device 120. The starting location is typically the current location of the first client device 120 determined by the G.P.S. module 315 of FIG. 3.

At a step 450, the starting location is sent to and received at the server 110.

At a step 455, an optimal route from the starting location to the target location is calculated at the server 110. The calculation takes into consideration real-time traffic information of the vicinity provided by, in part, of a community of users.

Figure 5J:
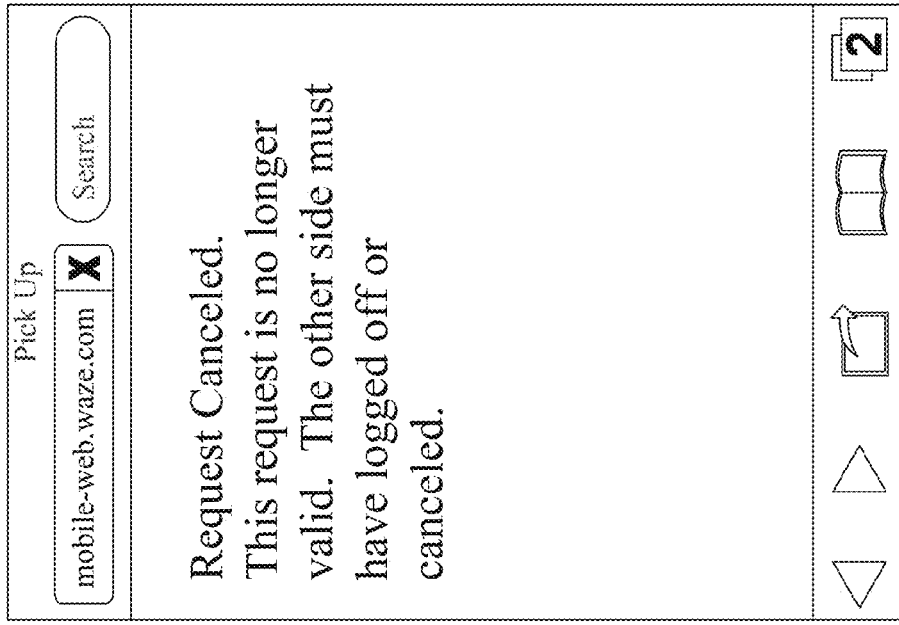
Figure 5I:
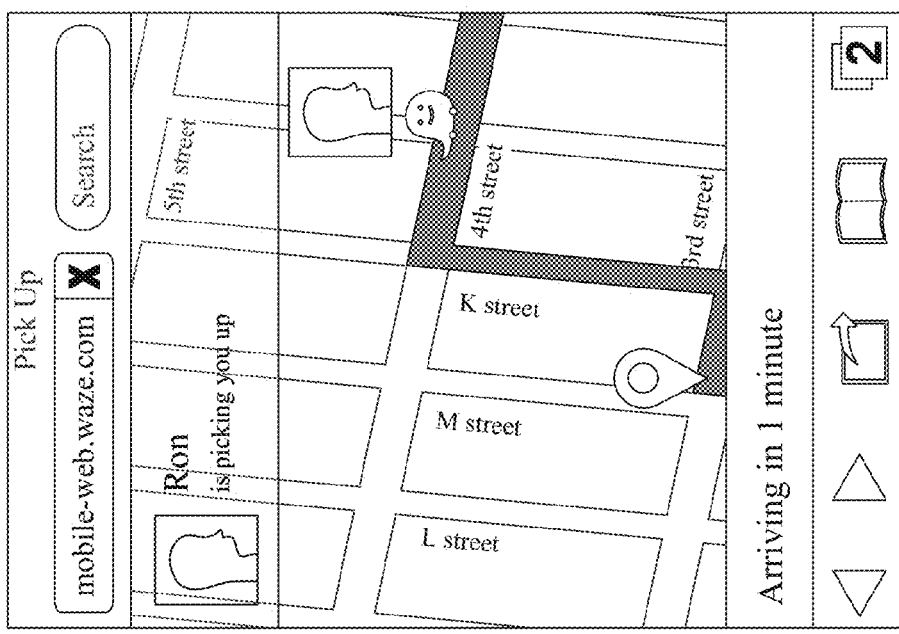

At a step 460 and at a step 465, map data is sent from the server 110 to the first client device 120 and the second client device 125, which in turn is displayed on the first client device 120 and the second client device 125. The map data allows for bidirectional viewing of the optimal route on the first client device 120 and the second client device 125. In some embodiments, the map data includes information regarding the principal user's location en-route and the target location, and ETA of the principal user to the target location. In some embodiments, the map data is shown in the mobile navigation application on the first client device 120, and the map data is shown in the web page on the web browser of the second client device 125. FIG. 5H illustrates an exemplary screen shot 570 of the first client device 120 of the map data displayed in the mobile navigation application. FIG. 5I illustrates an exemplary screen shot 575 of the second client device 125 of the map displayed in the web browser.

The navigation operation (e.g., Steps 445-470) repeats until the first client device 120 reaches the target destination, until the first client device 120 cancels the request, or until the first client device 120 is no longer communicatively coupled with the server 110. The principal user is able to disable tracking from the mobile navigation application. Once disabled, the dependent user is no longer able to follow the principal user's en route drive on the map or see the principal user's ETA displayed in the web browser of the second client device 125. FIG. 5J illustrates an exemplary screen shot 580 of the second client device 125 indicating that the request has been canceled.

In some embodiments, the principal user is able to share the URL address with others so that they can view the optimal route on their devices. Similarly, the dependent user is able to share the URL address with others so that they also can view the optimal route on their devices. As discussed elsewhere, the second client device 125 need not remain stationary. If the second client device 125 is roaming and if the target location is set to the current location of the second client device 125, the updated location of the second client device 125 is periodically sent to the server 110 for the calculation of the optimal route. Likewise, the dependent user can manually change the target location by entering location information.

Figure 6:
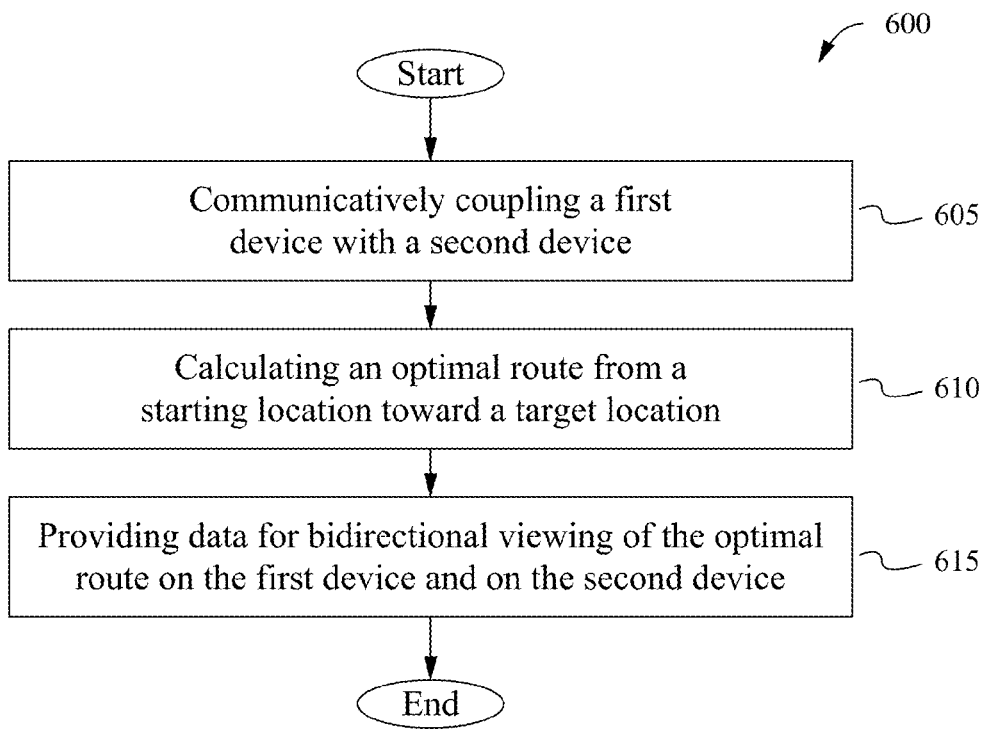
FIG. 6 illustrates an exemplary method performed by a server of providing map data in accordance with the present invention.

FIG. 6 illustrates an exemplary method 600 performed by a server, such as the server 110 of FIG. 1, of providing map data in accordance with the present invention. The method 600 starts at a Step 605, where the server 110 communicatively couples two client devices, such as the first client device 120 and the second client device 125 of FIG. 1.

Figure 7:
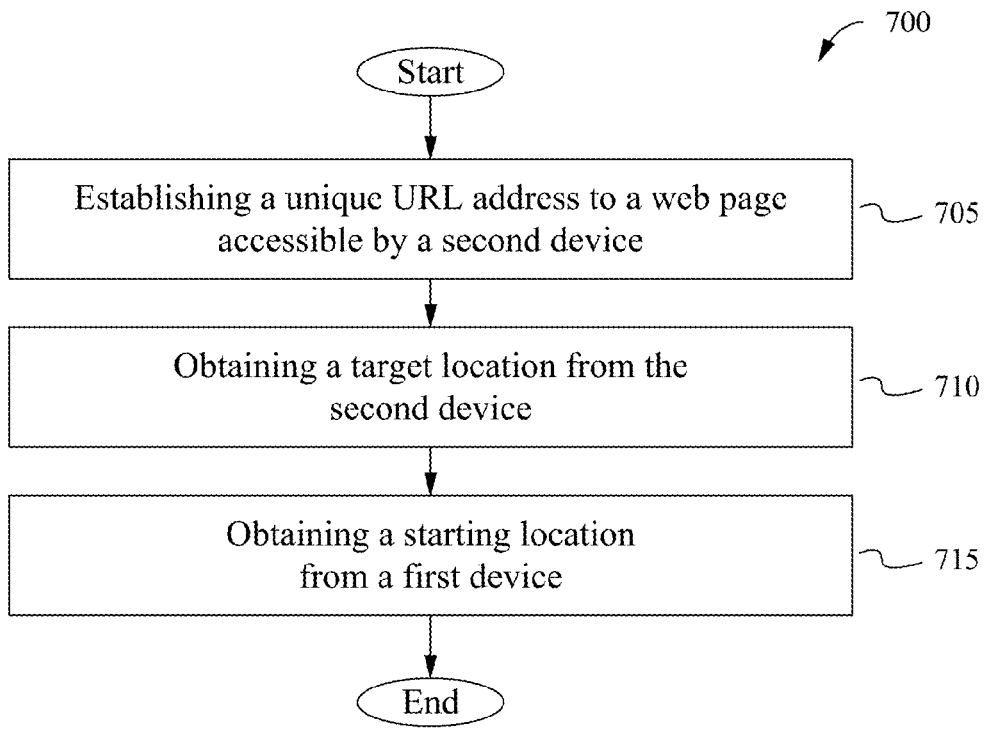
FIG. 7 illustrates an exemplary method performed by a server of communicatively coupling a first client device and a second client device in accordance with the present invention.

Details of the Step 605 are discussed above and further illustrated in FIG. 7. The exemplary method 700 of coupling two devices performed by the server 110 starts at a Step 705. After the server 110 receives indication that the first client device 120 would like to send a meet up request to a recipient (e.g., the second client device 125), at the Step 705, the server 110 establishes and sends a URL address to the first client device 120, which is also discussed in Steps 410 and 415 of FIG. 4. At a Step 710, the server 110 obtains a target location from the second client device 125, which is also discussed in Step 435 of FIG. 4. At a Step 715, the server 110 obtains a starting location from the first client device 120, which is also discussed in Step 450 of FIG. 4. After the Step 715, the method 700 ends.

Returning to FIG. 6, after the first client device 120 and the second client device 125 are communicatively coupled, at a step 410, the server 110 calculates an optimal route from the starting location towards the target location. The optimal route is determined based on updated location information of the first client device 120 and real-time traffic information between the two locations. As discussed above, the target location can be of a stationary target or a moving target. If the target location is of a moving target, then the optimal route is also based on updated location information of the second client device 125.

At a step 615, the server 110 provides map data for bidirectional viewing of the optimal route on the first end device 120 and on the second end device 125. In some embodiments, the optimal route is shown in the mobile navigation application running on the first end device 120, and the optimal route is shown in a web browser running on the second end device 125. After the Step 615, the method 600 ends.

Although the present invention has been discussed as the principal user sending a meet up request to a single recipient, it is contemplated that the principal user is able send a meet up request to more than one recipient, such as for purposes of car pooling. Typically, the principal user sends a request to each dependent user. Alternatively, a single request can be formed to multiple dependent users. After the dependent users either accept or reject the requests or unanswered requests time out, a navigation route is determined and shown to the relevant parties on their respective computing devices. Particularly, the map data is shown to the principal user in the mobile navigation application, and while the map data is shown to each of the relevant dependent users in a web browser.

For example, assume the principal user sends requests to dependent user 1, dependent user 2, dependent user 3, and dependent user 4. Dependent user 1 rejects the request, while dependent user 2, dependent user 3 and dependent user 4 accept the requests. Upon accepting the requests, dependent users 2-4 send their locations to the principal user. The server determines, based on present traffic conditions, that the best route is to first pick up dependent user 2, then dependent user 3, and then dependent user 4. However, after picking up dependent user 2, the server may determine that the best route now is to pick up dependent user 4 before dependent user 3 for some reason, which is or is not relayed to the parties. The navigation route can thus be dynamic in regards to the pick/meet up sequence. Changes in the sequence a dependent is picked up can occur due to a change in conditions including changes in traffic flow or movement of one or more dependents.

In addition or alternatively to, the navigation route can be dynamic in regards to the path(s) to be taken between two location points. For example, the navigation route can include Streets 1, 2 and 3 to get from point A to point B, but while the principal user is on Street 1, the navigation route can include Streets 4 and 5 instead to get from point A to point B. In some embodiments, the principal user is able to indicate one or more specific landmarks or facilities to stop at during a trip. Continuing with the example, the principal user can indicate that he/she would like to visit any or a specific convenient store at any time during the trip of picking up dependent users 2-4, or at any time prior to picking up a particular dependent user (e.g., dependent user 3). These specifications become a part of calculation when calculating a navigation route. These specifications can be added or modified at any time during the trip. These specification may or may not be hidden from the dependent users. Other specifications can include a mode of transportation (e.g., vehicle, public transportation, walking/biking, etc.) such that the navigation route is best suited for the specified mode.

It should be contemplated that additional target locations can be added as part of the trip at any time during the trip. These target locations are relayed to the server 110, which recalculates the optimal route based on the newly added target locations.

In some embodiments, a dependent user can be a requester and request a principal user to pick up or meet up with the dependent user. The dependent user's current location, or a location other than the current location, can be sent along with the request or is sent after the principal user receives and accepts the dependent user's request. Once the principal user accepts the request, parties are able to see one another's location. As discussed above, the dependent user does not need to remain stationary but is able to move about. Also as discussed above, the principal user is able to modify the trip with additional destinations, either stationary targets (e.g., landmarks and/or facilities) or moving targets (e.g., other dependent users).

As noted above, systems can identify the principal user's location and/or the dependent user (or users') locations and can support sharing of a route. Users of the system can be notified of what information is to be shared and the recipient(s) of the information prior to sharing that information. Sharing of location information (and route information) can be subject to a grant of permission by the respective user whose information is to be shared, and the user can be provided an interface to manage or revoke the permission at any time.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

What is claimed is:

1. A non-transitory computer-readable medium storing instructions that, when executed by a server computing device, cause the server computing device to perform a method comprising:
   receiving from a first computing device a first request to meet up with a second user;
   establishing, in response to the first request, a unique web address accessible by a second computing device associated with the second user;
   sending the unique web address to the first computing device;
   receiving, upon activation of the unique web address by the second computing device, a first target location from the second computing device;
   upon receiving the first target location, sending a request for a starting geographic location to the first computing device;
   receiving, from the first computing device, the starting geographic location;
   calculating an optimal route from the starting geographic location towards the geographic location of the first target location;
   providing, to both the first computing device and the second computing device, data including a map and the optimal route for display on both a display of the first computing device and a display of the second computing device;
   determining the location of both the first computing device and second computing device;
   updating the optimal route based on the determined location of both the first computing device and second computing device; and
   providing, to both the first computing device and the second computing device, updated data including an updated optimal route for display on both the display of the first computing device and the display of the second computing device.

2. The non-transitory computer-readable medium of claim 1, wherein the data further includes instructions displaying a user of the first device en route towards the first target location, and the user's estimated time of arrival (ETA) to the first target location.

3. The non-transitory computer-readable medium of claim 1, wherein the starting geographic location is automatically determined by the first computing device.

4. The non-transitory computer-readable medium of claim 1, wherein the starting geographic location is the current location of the first computing device.

5. The non-transitory computer-readable medium of claim 1, wherein the first target location is automatically determined by the second computing device.

6. The non-transitory computer-readable medium of claim 1, wherein the first target location is manually entered by a user of the second computing device.

7. The non-transitory computer-readable medium of claim 1, wherein the optimal route is also updated based on at least one of real-time traffic information and a newly added second target location.

8. The non-transitory computer-readable medium of claim 7, wherein the real-time traffic information is determined based at least on real-time community information provided to the server computing device from other devices.

9. The non-transitory computer-readable medium of claim 1, wherein the method further comprises sharing the unique web address with other users such that the other users are able to view the optimal route.

10. A system comprising:
one or more processors; and
a machine-readable medium comprising instructions stored therein, which when executed by the one or more processors, cause the one or more processors to perform operations comprising:
receiving a first request to meet up with a second user;
establishing, in response to receiving the first request to meet up with the second user, a unique web address to a resource accessible by a second computing device associated with the second user;
sending the unique web address to the first computing device;
receiving, upon activation of the unique web address by the second computing device, a first target location from the second computing device;
receiving, from the first computing device, a starting geographic location;
calculating an optimal route from the starting geographic location towards the geographic location of the target location; and
providing, to both the first computing device and the second computing device data including a map and the optimal route for display on both a display of the first computing device via a navigation application and a display of the second computing device via the web browser;
determining, the location of both the first computing device and second computing device;
updating the optimal route based on the determined location of both the first computing device and second computing device; and
providing, to both the first computing device and the second computing device, updated data including an updated optimal route for display on both the display of the first computing device and the display of the second computing device.

11. The system of claim 10, wherein the navigation application is configured to launch a program available on the first client device to inform the second client device of the meet up request.

12. The system of claim 10, wherein the target location is a current location of the second client device.

13. The system of claim 10, wherein the target location is automatically modified based on a current location of the second client device.

14. The system of claim 10, wherein the target location is modifiable by the second client device.

15. The medium of claim 1, wherein the data is provided for display on the first computing device via a navigation application and on the second computing device via the unique web address.

16. A method comprising:
receiving, by one or more processors, from a first computing device, a first request to meet up with a second user;
establishing, by the one or more processors, in response to the received first request, a unique web address to a resource accessible by a second device;
sending, by the one or more processors, the unique resource address to the first computing device
receiving, by the one or more processors, upon activation of the unique web address by the second computing device, a first target location to from the second computing device;
upon receiving the first target location, sending, by the one or more processors, a request for a starting geographic location to the first computing device;
receiving, by the one or more processors, from the first computing device, a starting geographic location;
calculating, by the one or more processors, an optimal route from the starting geographic location towards the geographic location of the first target location; and
providing, by the one or more processors, to both the first computing device and the second computing device, data including a map and the optimal route for display on both a display of the first computing device and a display of the second computing device;
determining, by the one or more processors, the location of both the first computing device and second computing device;
updating, by the one or more processors, the optimal route based on the determined location of both the first computing device and second computing device; and
providing, by the one or more processors, to both the first computing device and the second computing device, updated data including an updated optimal route for display on both the display of the first computing device and the display of the second computing device.

* * * * *